United States Patent
Adefris et al.

(10) Patent No.: US 9,447,311 B2
(45) Date of Patent: Sep. 20, 2016

(54) DUAL TAPERED SHAPED ABRASIVE PARTICLES

(75) Inventors: Negus B. Adefris, Woodbury, MN (US); Ehrich J. Braunschweig, Woodbury, MN (US); Steven J. Keipert, Somerset, WI (US)

(73) Assignee: 3m Innovative Properties Company, St. Paul, MN (US)

( * ) Notice: Subject to any disclaimer, the term of this patent is extended or adjusted under 35 U.S.C. 154(b) by 491 days.

(21) Appl. No.: 13/498,636

(22) PCT Filed: Nov. 23, 2010

(86) PCT No.: PCT/US2010/057713
§ 371 (c)(1),
(2), (4) Date: Mar. 28, 2012

(87) PCT Pub. No.: WO2011/068714
PCT Pub. Date: Jun. 9, 2011

(65) Prior Publication Data
US 2012/0227333 A1   Sep. 13, 2012

Related U.S. Application Data

(60) Provisional application No. 61/266,000, filed on Dec. 2, 2009.

(51) Int. Cl.
| | | |
|---|---|---|
| B24D 3/00 | (2006.01) | |
| B24D 3/02 | (2006.01) | |
| B24D 11/00 | (2006.01) | |
| B24D 18/00 | (2006.01) | |
| C09K 3/14 | (2006.01) | |

(52) U.S. Cl.
CPC ............... *C09K 3/1409* (2013.01); *B24D 3/00* (2013.01); *B24D 11/00* (2013.01)

(58) Field of Classification Search
USPC .......................................... 51/309, 293, 307
See application file for complete search history.

(56) References Cited

U.S. PATENT DOCUMENTS

| | | | |
|---|---|---|---|
| 3,481,723 A | 12/1969 | Kistler | |
| 5,201,916 A * | 4/1993 | Berg | B24D 3/14 264/6 |
| 5,366,523 A | 11/1994 | Rowenhorst | |
| 5,409,645 A | 4/1995 | Torre, Jr. | |
| 5,496,386 A | 3/1996 | Broberg | |
| 5,584,896 A | 12/1996 | Broberg | |
| 5,975,988 A | 11/1999 | Christianson | |
| 5,984,988 A | 11/1999 | Berg | |

(Continued)

FOREIGN PATENT DOCUMENTS

| | | |
|---|---|---|
| CN | 19315122 A | 3/2007 |
| GB | 986847 | 3/1965 |

(Continued)

*Primary Examiner* — James McDonough
(74) *Attorney, Agent, or Firm* — Scott A. Baum; David B. Patchett

(57) ABSTRACT

Shaped abrasive particles comprising alpha alumina and having a first side, a second side, a maximum length along a longitudinal axis and a maximum width transverse to the longitudinal axis. The first side comprising a quadrilateral having four edges and four vertices with the quadrilateral selected from the group consisting of a rhombus, a rhomboid, a kite, or a superellipse. The shaped abrasive particles having an aspect ratio of the maximum length divided by the maximum width of 1.3 or greater.

20 Claims, 13 Drawing Sheets

(56) References Cited

U.S. PATENT DOCUMENTS

| | | | |
|---|---|---|---|
| 6,054,093 A | 4/2000 | Torre, Jr. | |
| 6,475,253 B2 | 11/2002 | Culler | |
| 6,811,471 B2 | 11/2004 | Beaudoin | |
| 2002/0026752 A1 | 3/2002 | Culler | |
| 2005/0118939 A1* | 6/2005 | Duescher | B24D 11/00 451/527 |
| 2007/0254560 A1 | 11/2007 | Woo | |
| 2008/0026583 A1* | 1/2008 | Hardy | B24B 37/044 438/693 |
| 2009/0165394 A1* | 7/2009 | Culler | B01J 2/22 51/296 |
| 2009/0169816 A1 | 7/2009 | Erickson | |
| 2010/0024310 A1* | 2/2010 | Sung | C09K 3/1409 51/295 |
| 2010/0146867 A1 | 6/2010 | Boden | |
| 2010/0151195 A1 | 6/2010 | Culler | |
| 2010/0151196 A1 | 6/2010 | Adefris | |
| 2010/0151201 A1 | 6/2010 | Erickson | |
| 2010/0319269 A1 | 12/2010 | Erickson | |
| 2011/0258938 A1* | 10/2011 | Morinaga | B24D 3/00 51/309 |

FOREIGN PATENT DOCUMENTS

| | | |
|---|---|---|
| JP | 2007-044824 A | 2/2007 |
| WO | WO 99/38817 | 8/1999 |
| WO | WO 99/54424 | 10/1999 |

* cited by examiner

DUAL TAPERED SHAPED ABRASIVE PARTICLES

CROSS REFERENCE TO RELATED APPLICATIONS

This application is a national stage filing under 35 U.S.C. 371 of PCT/US2010/057713 filed Nov. 23, 2010, which claims priority to U.S. Provisional Patent Application No. 61/266,000, filed Dec. 2, 2009, the disclosures of which are incorporated by reference in their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst (Re 35,570); and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle, it is possible to control the resulting performance of the abrasive article. The inventors have discovered that by making the shaped abrasive particles such that the shaped abrasive particles taper towards each of their opposing ends (dual tapered), significantly improved grinding performance results.

When shaped abrasive particles are used to make a coated abrasive article, typically an electrostatic field is used to pick up and move the shaped abrasive particles into contact with the resin comprising the make coat to adhere them to a backing. One advantage of the presently claimed shaped abrasive particles is that as more and more shaped abrasive particles are attached to the backing, each shaped abrasive particle will tend to orientate into the make coat such that a point is present on the grinding face of the abrasive article as shown in FIGS. 6 and 7. This occurs since the shaped abrasive particles are longer than wide and taper towards each end.

When triangular shaped abrasive particles are coated, as more particles are applied, some of the triangles will begin to fill in between existing triangles with their point attached to the make coat and the base of the triangle exposed to the grinding face as seen in FIG. 3 of U.S. Pat. No. 5,201,916. This effect is especially pronounced in closed coat constructions of the abrasive article wherein virtually the entire grinding face of the abrasive article is covered with the shaped abrasive particles. For some applications, reduced grinding performance occurs when horizontal surfaces, such as the triangle's base instead of the triangle's points, are present on the grinding face.

Other advantages of the dual tapered shaped abrasive particles are believed to be improved impact resistance and reduced shelling. Since the shaped abrasive particles are wider near the middle than at the ends, the particles can have improved stiffness over a particle having a consistent cross sectional area such as a rod shaped abrasive particle. High aspect ratio rod shaped abrasive particles can simply snap off at the base where they are anchored into the make and size coat when subjected to impacts such as grinding a sharp edge under high loads. In contrast, the currently claimed shaped abrasive particles can be buried about halfway into the make and size coats leaving a much wider base where the shaped abrasive particle emerges from the coats improving impact resistance. Furthermore, since a significant portion of the shaped abrasive particle can be buried into the make and size coats, similar to the root of a tooth, reduced shelling of the abrasive particles from the abrasive article is possible.

Another advantage in some embodiments is that the shaped abrasive particles can comprise a vertex and four facets on an opposing side. The facets, by virtue of being angled, can tip the shaped abrasive particle relative to the backing even when the shaped abrasive particle falls over after being attached to the make coat or is directly attached more horizontally to the make coat. This again helps to prevent presenting a substantially horizontal surface of the shaped abrasive particle to the grinding face and thereby to the material being abraded by the shaped abrasive particles. As seen in FIG. 7, shaped abrasive particles which are lying more horizontally than vertically in the grinding face of the coated abrasive article such as the particles labeled, H, still have sharp edges and points that initially contact the material being abraded, instead of a horizontal surface, thereby improving cut performance.

Hence, in one embodiment, the invention resides in shaped abrasive particles comprising alpha alumina and having a first side, a second side, a maximum length along a longitudinal axis and a maximum width transverse to the longitudinal axis; the first side comprising a quadrilateral having four edges and four vertices with the quadrilateral selected from the group consisting of a rhombus, a rhomboid, a kite, or a superellipse; and wherein an aspect ratio of the maximum length divided by the maximum width is 1.3 or greater.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Figure 1C:
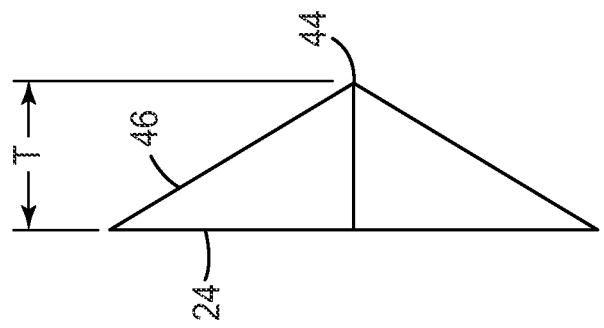
FIGS. 1A, 1B, and 1C illustrate a first side, a second side, and a side view of one embodiment of a shaped abrasive particle.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the precursor shaped abrasive particle. Except in the case of abrasive shards (e.g. as described in U.S. Provisional Application No. 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

DETAILED DESCRIPTION

Dual Tapered Shaped Abrasive Particles

Referring to FIGS. 1-5 exemplary dual tapered shaped abrasive particles 20 are illustrated. The material from which the shaped abrasive particle 20 is made comprises alpha alumina. Alpha alumina particles can be made from a dispersion of aluminum oxide monohydrate that is gelled, molded to shape, dried to retain the shape, calcined, and then sintered as discussed herein later. The shaped abrasive particle's shape is retained without the need for a binder to form an agglomerate comprising abrasive particles in a binder that are then formed into a shaped structure.

Figure 3C:
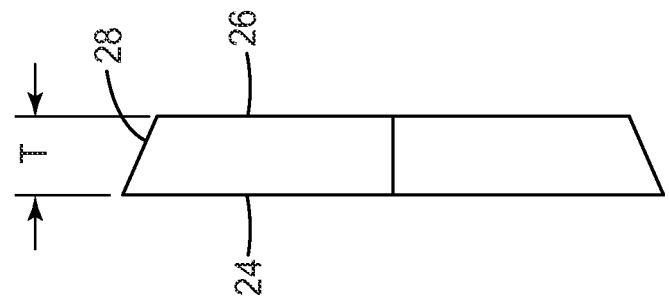
FIGS. 3A, 3B, and 3C illustrate a first side, a second side, and a side view of another embodiment of a shaped abrasive particle.
Figure 3B:
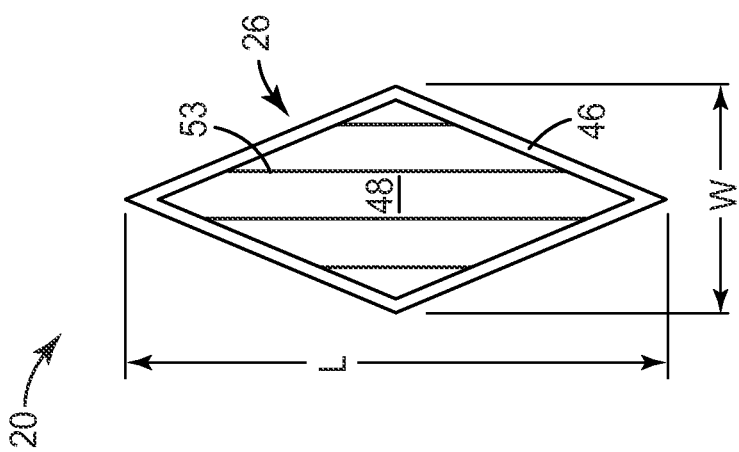
Figure 3A:
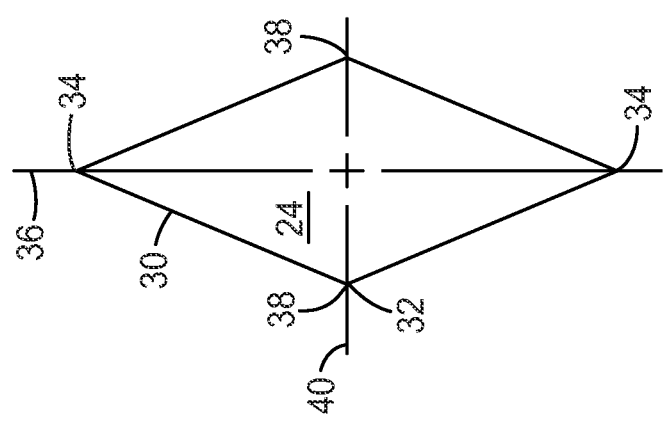
Figure 5C:
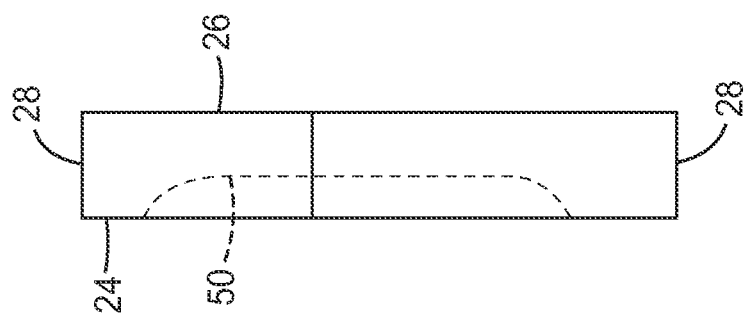
FIGS. 5A, 5B, and 5C illustrate a first side, a second side, and a side view of another embodiment of a shaped abrasive particle.
Figure 5B:
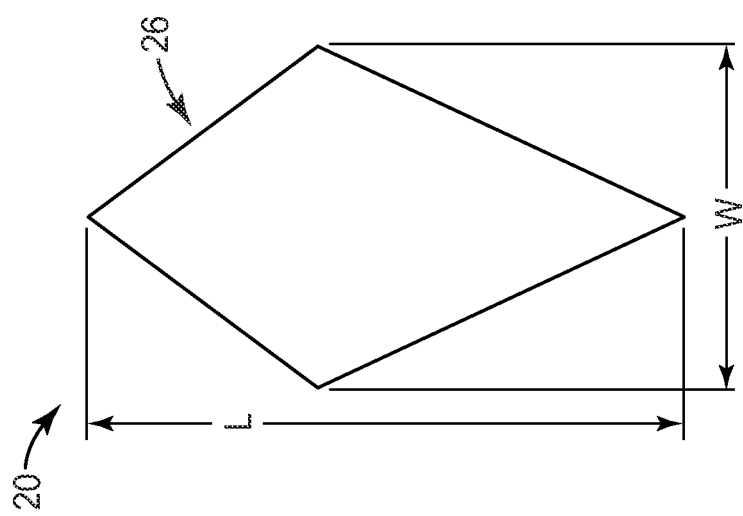
Figure 5A:
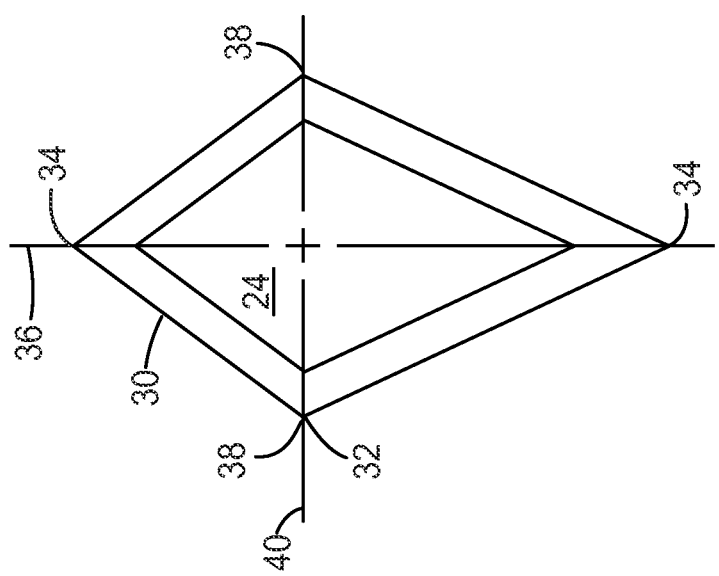

In general, the shaped abrasive particles 20 comprise thin bodies having a first side 24, and a second side 26 and having a thickness T. In some embodiments, the thickness T ranges between about 5 micrometers to about 1 millimeter. In some embodiments, the first side 24 and the second side 26 are connected to each other by at least one sidewall 28, which may be a sloping sidewall as shown in FIG. 3 having a draft angle α other than 90 degrees. In some embodiments, more than one sloping sidewall 28 can be present and the slope or angle for each sloping sidewall 28 may be the same or different as more fully described in pending U.S. patent application Ser. No. 12/337,075 filed on Dec. 17, 2008 entitled "Shaped Abrasive Particles With A Sloping Sidewall." In other embodiments, the sidewall 28 can intersect the first side 24 and the second side 26 at a 90 degree angle as shown in FIG. 5.

In general, the first side 24 of the shaped abrasive particle comprises a quadrilateral having four edges 30 and four vertices 32 with the quadrilateral selected from the group consisting of a rhombus, a rhomboid, a kite, or a superellipse. The vertices of the quadrilateral can be further classified as a pair of opposing major vertices 34 that are intersected by a longitudinal axis 36 and a pair of opposing minor vertices 38 located on opposite sides of the longitudinal axis 36.

Figure 1B:
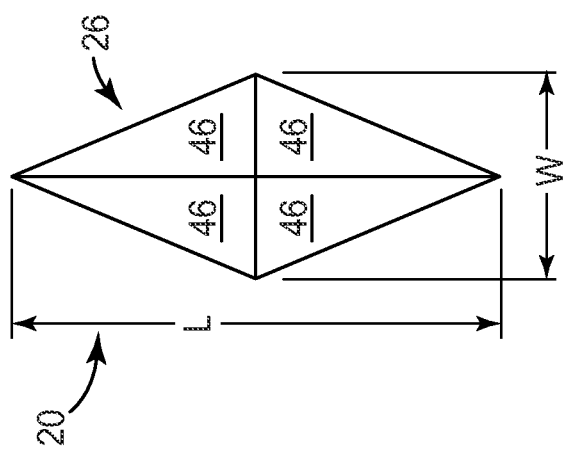
Figure 1A:
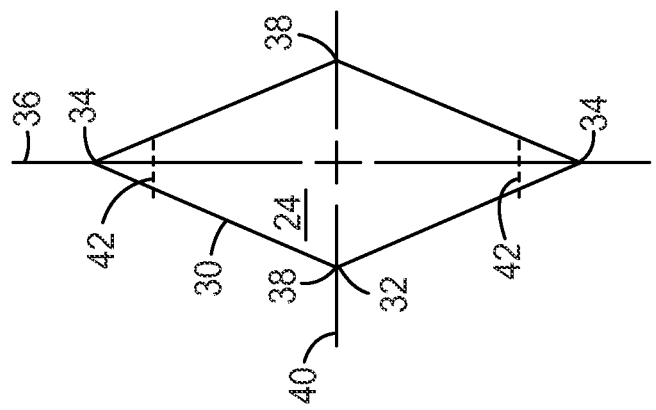
Figure 2C:
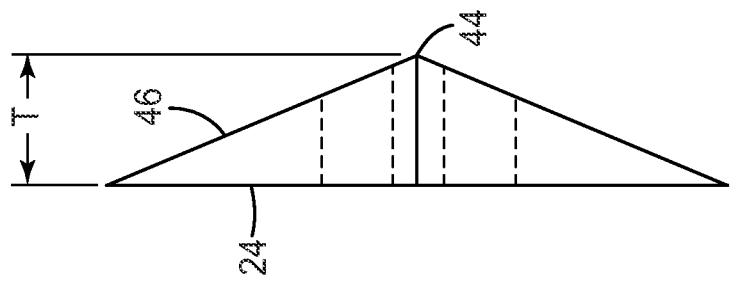
FIGS. 2A, 2B, and 2C illustrate a first side, a second side, and a side view of another embodiment of a shaped abrasive particle.
Figure 2B:
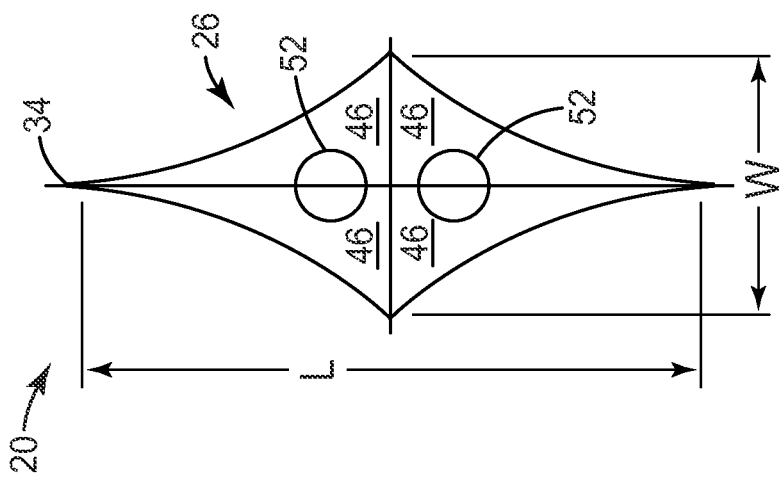
Figure 2A:
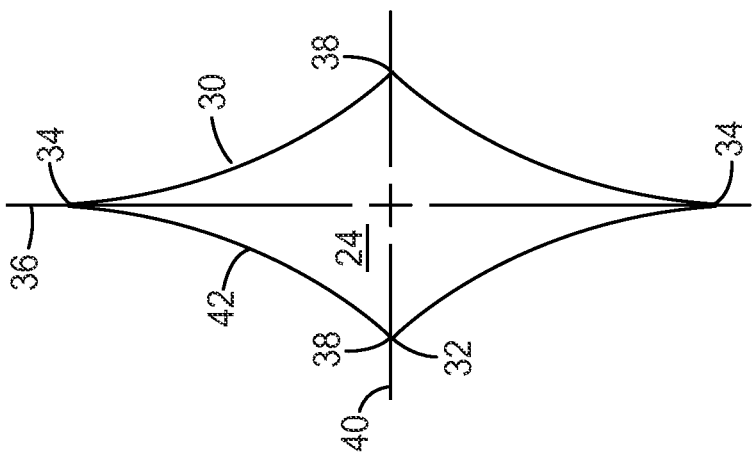
Figure 4C:
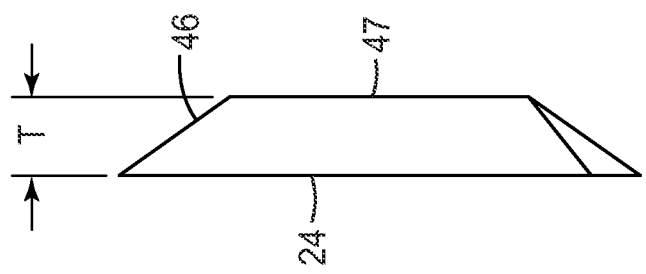
FIGS. 4A, 4B, and 4C illustrate a first side, a second side, and a side view of another embodiment of a shaped abrasive particle.
Figure 4B:
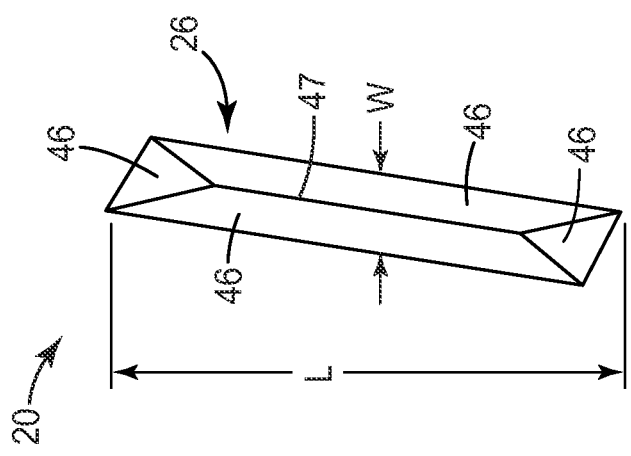
Figure 4A:
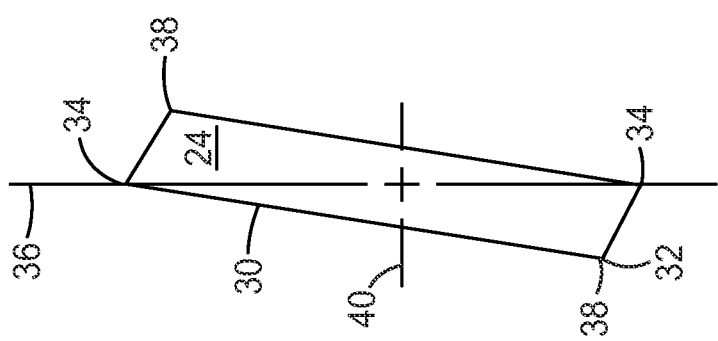

A rhombus is a quadrilateral having four edges of equal length and wherein opposing vertices have included angles of equal degrees as seen in FIGS. 1 and 3. A rhomboid is a parallelogram wherein the two intersecting edges 30 on one side of the longitudinal 36 axis are of unequal lengths and the vertex 32 between these edges has an oblique included angle as seen in FIG. 4. A kite, as seen in FIG. 5, is a quadrilateral wherein the two opposing edges 30 above a transverse axis 40 are of equal length and the two opposing edges 30 below the transverse axis 40 are of equal length, but have a different length than the edges above the transverse axis. If you took a rhombus and moved one of the opposing major vertices 34 either closer to or further away from the transverse axis 40 a kite is formed. A superellipse is a geometric figure defined by Lamé's curve having the formula $(x/a)^n+(y/b)^n=1$ where n, a, and b are positive numbers. When n is between 0 and 1, the superellipse looks like a four-armed star with concave edges (without the scallops) as shown in FIG. 2. When n equals 1, a rhombus a=b or a kite a≠1) is formed. When n is between 1 and 2 the edges 30 become convex.

The shape of the first side 24 is selected from the above groups since these shapes will result in a shaped abrasive particle with opposing major vertices 34 along the longitudinal axis 36 and in a shape that tapers from the transverse axis 40 toward each opposing major vertex. As such, the shaped abrasive particle will have tend to have one major vertex 34 in the make coat and the second major vertex 34 exposed to the grinding face when an electrostatic field is used to apply the shaped abrasive particles to a coated backing; especially, as more and more shaped abrasive particles are applied to the backing.

The degree of taper can be controlled by selecting a specific aspect ratio for the particle as defined by the maximum length, L, along the longitudinal axis 36 divided by the maximum width, W, along the transverse axis 40 that is perpendicular to the longitudinal axis 36. The shaped abrasive particles in FIGS. 1, 2, and 3 all have an aspect ratio of approximately 2.4. The shaped abrasive particle in FIG. 4 has and aspect ratio of approximately 6.2. The shaped abrasive particle of FIG. 5 has an aspect ratio of approximately 1.8. The aspect ratio should be greater than 1.0 for the shaped abrasive particle to taper as desired for improved electrostatic coating. In various embodiments of the invention, the aspect ratio is between about 1.3 to about 10, or between about 1.5 to about 8, or between about 1.7 to about 5. As the aspect ratio becomes too large, the shaped abrasive particle can become too fragile. This can cause the shaped abrasive particle to break off, as opposed to being gradually worn down, when used under heavy loads to grind objects having sharp edges where impact loading on the shaped abrasive particles can be severe. Desirably, the aspect ratio is selected such that a sufficient width and/or thickness of the shaped abrasive particle is buried into the make and size coats to prevent snapping off the very tip of the shaped abrasive particle and shelling the particle from the coated abrasive article.

In some embodiments, it is possible to slightly truncate one or more of the vertices as shown by dashed lines 42 in FIG. 1 and mold the shaped abrasive particles into such a configuration. It is believed that such particles will have a reduced initial cut, and somewhat resemble the shape of the abrasive particles after using them for a short period of time to abrade materials. Therefore, it is possible to design the shaped abrasive particles with one or more truncated vertices for applications where a larger initial bearing area or reduced initial cut are desired. In these embodiments, if the edges where the truncation occurs can be extended to form one or more an imaginary vertices that then completes the claimed quadrilateral, the first side 24 is considered to be the claimed shape. For example, if both of the major opposing vertices 34 were truncated as shown by dashed lines 42, the resulting shape would still be considered to be a rhombus because when the edges are extended past the truncation they form two imaginary vertexes thereby completing the rhombus shape for the first side 24.

Figure 7:
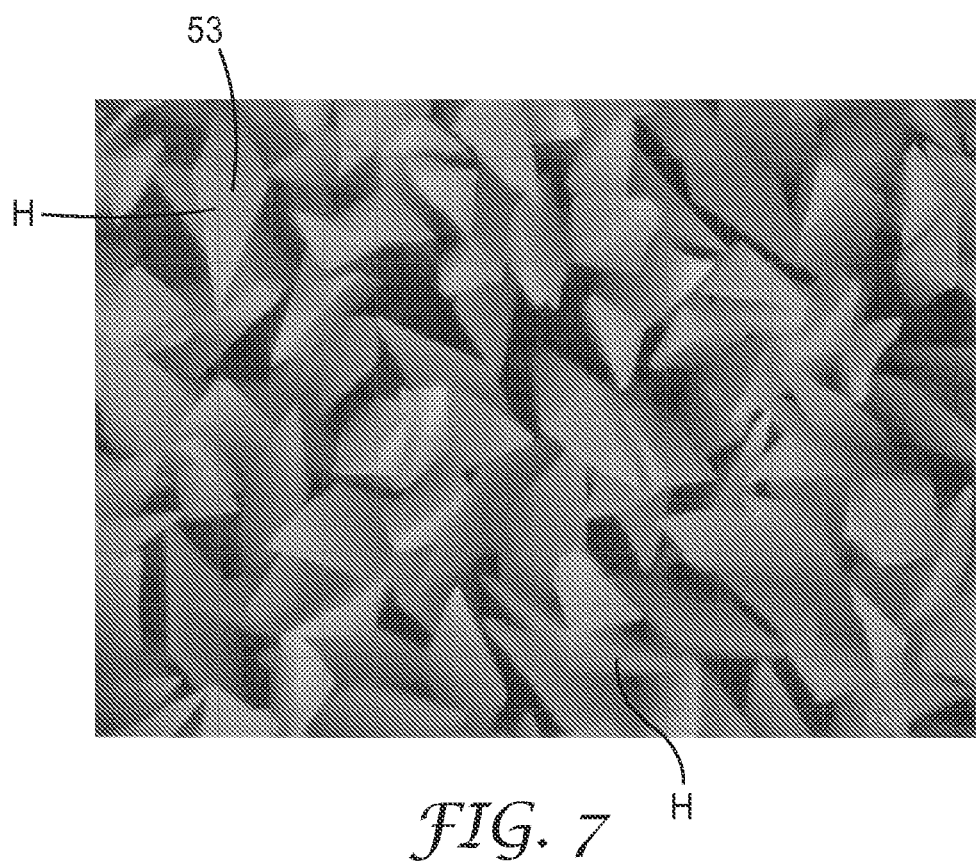
FIG. 7 is a photomicrograph of the grinding face of a coated abrasive article made from the shaped abrasive particles of FIG. 1.

In some embodiments, the second side 26 comprises a vertex 44 and four facets 46 forming a pyramid as shown in FIGS. 1, and 2. In such embodiments, the thickness, T, of the shaped abrasive particles can be controlled to select an angle, B, between the first side 24 and the facets 46. The facets 46, by virtue of being angled, can tip the shaped abrasive particle relative to the backing even when the shaped abrasive particle falls over after being attached to the make coat or is directly attached more horizontally to the make coat. This again helps to prevent presenting a substantially horizontal surface of the shaped abrasive particle to the grinding face and thereby to the material being abraded by the shaped abrasive particles. As seen in FIG. 7, shaped abrasive particles which are lying more horizontally than vertically in the grinding face of the coated abrasive article such as the particles labeled, H, still have sharp edges and opposing minor vertices 38 that initially contact the material being abraded, instead of a horizontal surface, thereby improving cut performance. This embodiment for the second side 26 can be used with any of the recited shapes for the first side 24.

In various embodiments of the invention, the angle β between the first side 24 and the facets 46 can be between 20 degrees to about 50 degrees, or between about 10 degrees to about 60 degrees, or between about 5 degrees to about 65 degrees.

In some embodiments, the second side 26 can comprises a ridge line 47 and four facets 46 forming a structure similar to a hip roof as seen in FIG. 4. Thus, two opposing facets will have a triangular shape and two opposing facets will have a trapezoidal shape. Similar ranges for the angle β between the first side and the facets 46 can be used in this embodiment. This embodiment for the second side 26 can be used with any of the recited shapes for the first side 24.

Figure 6:
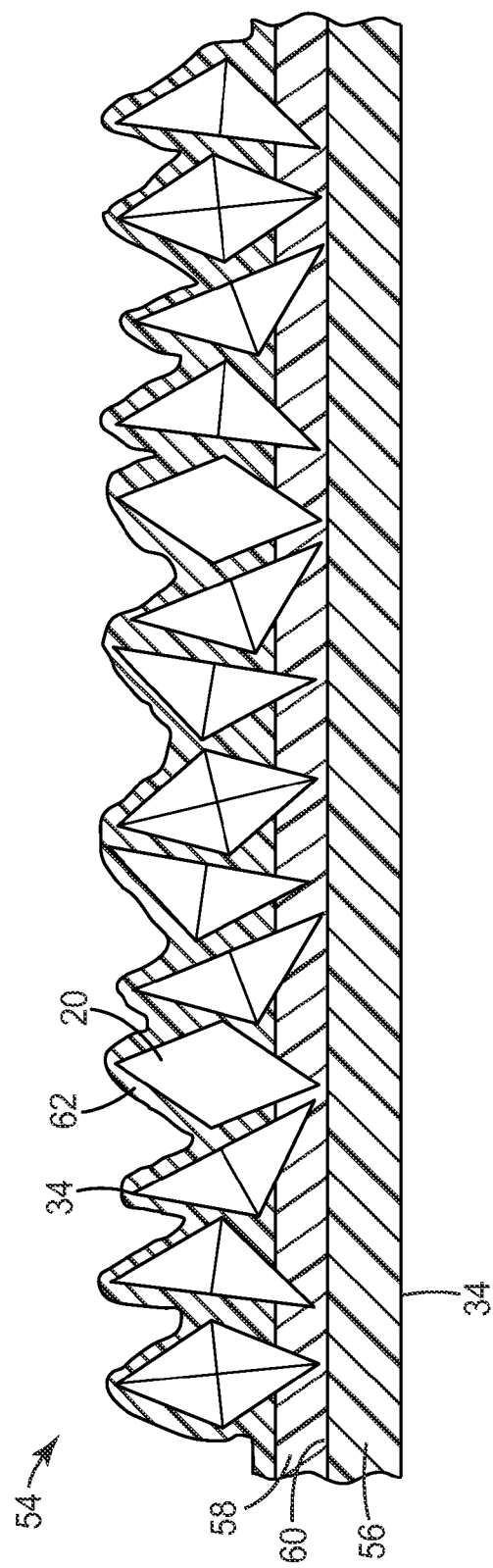
FIG. 6 illustrates a coated abrasive article made from the shaped abrasive particles of FIG. 1.

In some embodiments, the second side 26 comprises a second face 48 and four facets that form a sidewall 28 (draft angle α between the sidewall 28 and the second face 48 equals 90 degrees as seen in FIG. 5) or a sloping sidewall 28 (draft angle α between the sidewall 28 and the second face 48 greater than 90 degrees as seen in FIG. 3). As the thickness, T, of this shaped abrasive particle becomes greater, the shaped abrasive particle resembles a truncated pyramid when the draft angle α is greater than 90 degrees. The draft angle α between the second face 48 and the sidewall 28 of the shaped abrasive particle 20 can be varied to change the relative size of the second face 48. In various embodiments of the invention, the draft angle α can be between approximately 90 degrees to approximately 135 degrees, or between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As discussed in U.S. patent application Ser. No. 12/337,075 entitled "Shaped Abrasive Particles With A Sloping Sidewall" filed on Dec. 17, 2008, specific ranges for the draft angle α have been found to produce surprising increases in the grinding performance of coated abrasive articles made from the shaped abrasive particles with a sloping sidewall. In particular, draft angles of 98 degrees, 120 degrees, or 135 degrees have been found to have improved grinding performance over a draft angle of 90 degrees. The improvement in grinding performance is particularly pronounced at draft angles of 98 degrees or 120 degrees as seen in FIGS. 6 and 7 of U.S. patent application Ser. No. 12/337,075. This embodiment for the second side 26 can be used with any of the recited shapes for the first side 24.

In some embodiments, the first side 24 is substantially planar, the second face 48 is substantially planar, or both are substantially planar. Alternatively, the first side 24 could be concave or recessed 50 as discussed in more detail in copending U.S. patent application Ser. No. 12/336,961 entitled "Dish-Shaped Abrasive Particles With A Recessed Surface", filed on Dec. 17, 2008. FIG. 5 shows a shaped abrasive particle having a concave 50 first side 24. A concave or recessed 50 surface can be created by selecting drying conditions for the sol gel while residing in the mold cavity that forms a meniscus in the sol gel tending to wick the edges of the sol gel up the sides of the mold as discussed in U.S. patent application Ser. No. 12/336,961. A concave surface 50 on the first side 24 can help to increase the cutting performance in some applications similar to a hollow ground chisel blade. While the recess 50 is only shown in the embodiment of FIG. 5, such a feature can be used with any of the features or combinations of features or embodiments shown or described in this patent application.

Additionally, one or more openings 52 through the shaped abrasive particle passing through the first side 24 and the second side 26 could be present as discussed in more detail in copending U.S. patent application Ser. No. 12/337,112 entitled "Shaped Abrasive Particles With An Opening", filed on Dec. 17, 2008. FIG. 2 shows two openings 52 passing through the shaped abrasive particle. An opening 52 through the shaped abrasive particle can reduce the bulk density of the shaped abrasive particles thereby increasing the porosity of the resulting abrasive article in some applications, such as a grinding wheel, where increased porosity is often desired. Alternatively, the opening can reduce shelling by anchoring the particle into the size coat more firmly or the opening can act as a reservoir for a grinding aid. An opening can be formed into the shaped abrasive particle by selecting drying conditions that exaggerate the meniscus phenomenon discussed above, or by making a mold having one or more posts extending from the bottom similar to a Bundt cake pan. Methods of making shaped abrasive particles with an opening are discussed in U.S. patent application Ser. No. 12/337, 112. While the opening 52 is only shown in the embodiment of FIG. 2, such a feature can be used with any of the features or combinations of features or embodiments shown or described in this patent application.

Additionally, the shaped abrasive particles can have a plurality of grooves 53 (FIG. 3) on the second side 26 as described in copending Provisional Application U.S. Ser. No. 61/138,268 entitled "Shaped Abrasive Particles With Grooves" filed on Dec. 17, 2008. The grooves are formed by a plurality of ridges in the bottom surface of the mold cavity that have been found to make it easier to remove the precursor shaped abrasive particles from the mold. It is believed that a ridge having a triangular shaped cross section acts as a wedge lifting the precursor shaped abrasive particle off of the mold's bottom surface under drying conditions that promote shrinkage of the sol gel while residing in the mold cavity. By closely viewing the shaped abrasive particles in FIG. 6, the plurality grooves 53 on the second side 26 can be seen. While the grooves 53 are only shown in the embodiment of FIG. 3, such a feature can be used with any of the features or combinations of features or embodiments shown or described in this patent application.

Figure 8:
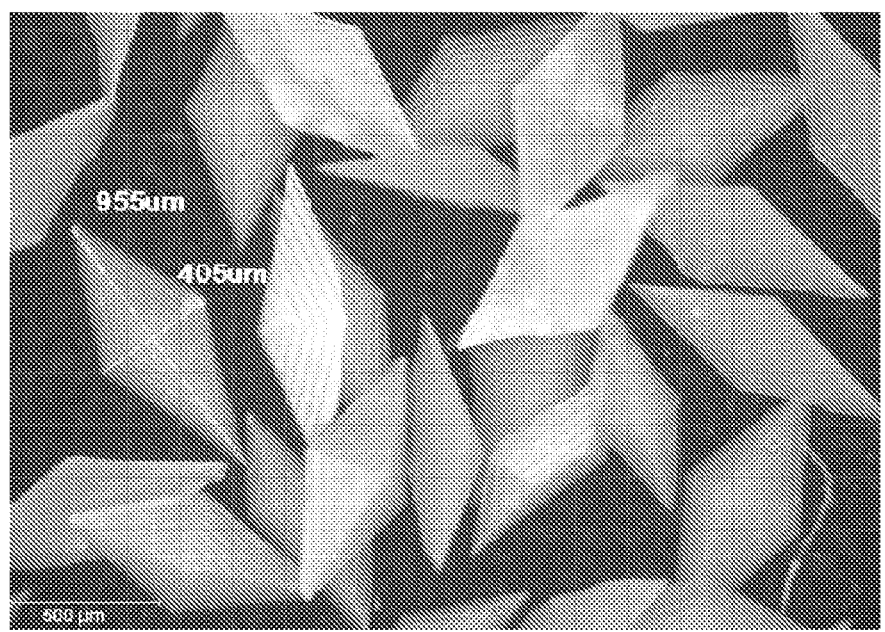
FIG. 8 is a photomicrograph of −50/+60 right rhombic pyramidal shaped abrasive particles versus crushed particles.
Figure 9:
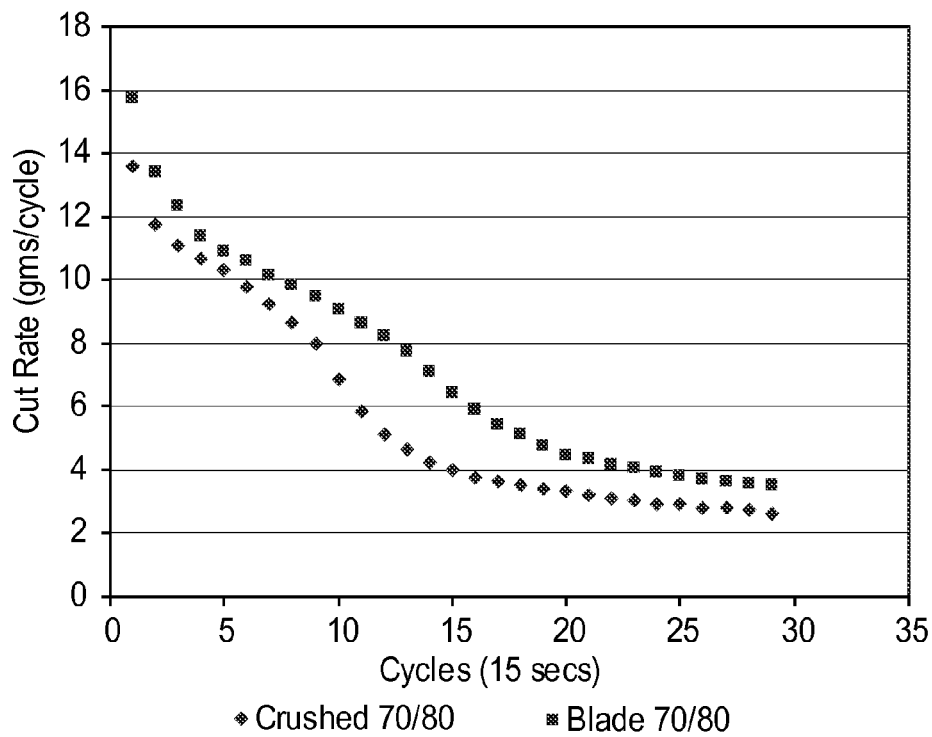
FIG. 9 is a graph of cut rate as a function of cycles for −70/+80 right rhombic pyramidal shaped abrasive particles (FIG. 1) versus crushed particles.
Figure 10:
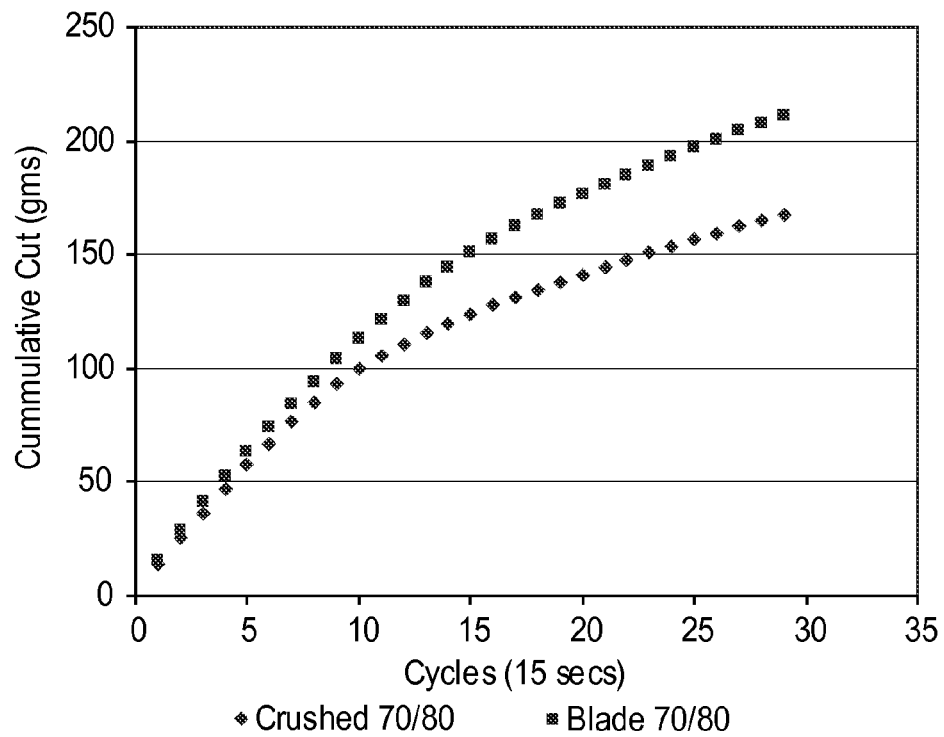
FIG. 10 is a graph of cumulative cut as a function of cycles for −70/+80 right rhombic pyramidal shaped abrasive particles (FIG. 1) versus crushed particles.
Figure 11:
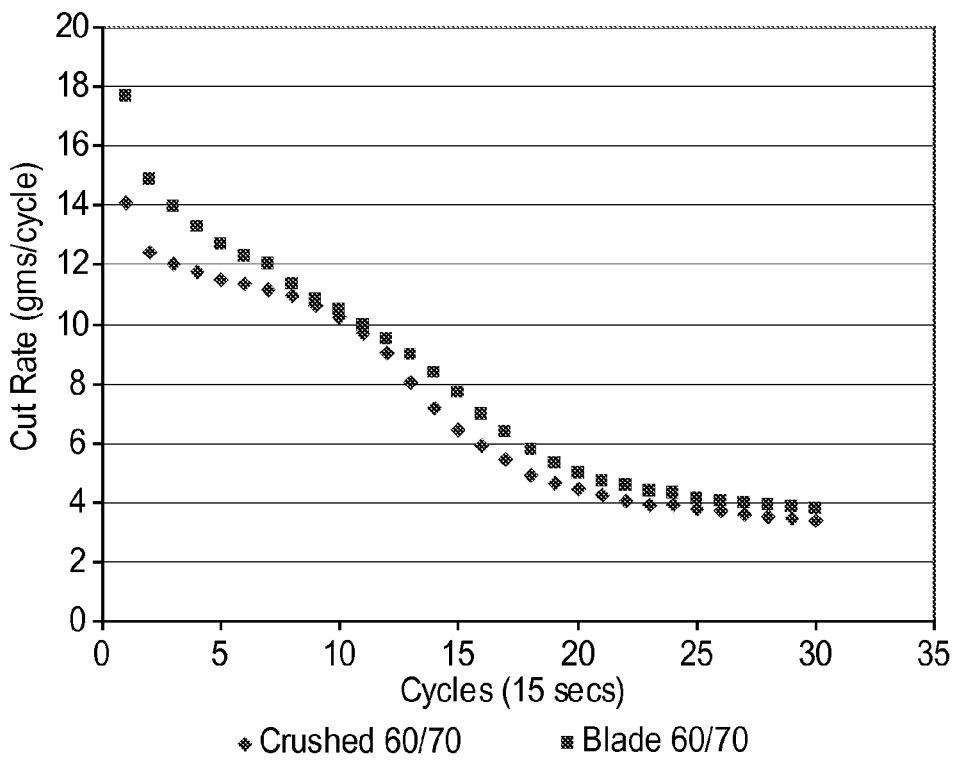
FIG. 11 is a graph of cut rate as a function of cycles for −60/+70 right rhombic pyramidal shaped abrasive particles (FIG. 1) versus crushed particles.
Figure 12:
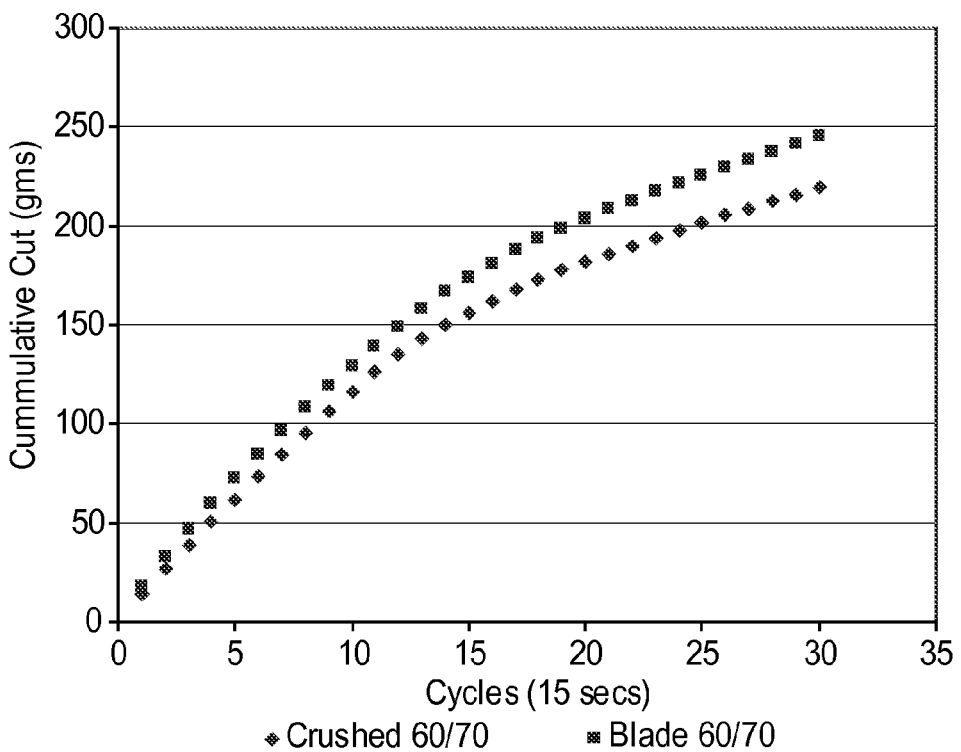
FIG. 12 is a graph of cumulative cut as a function of cycles for −60/+70 right rhombic pyramidal shaped abrasive particles (FIG. 1) versus crushed particles.
Figure 13:
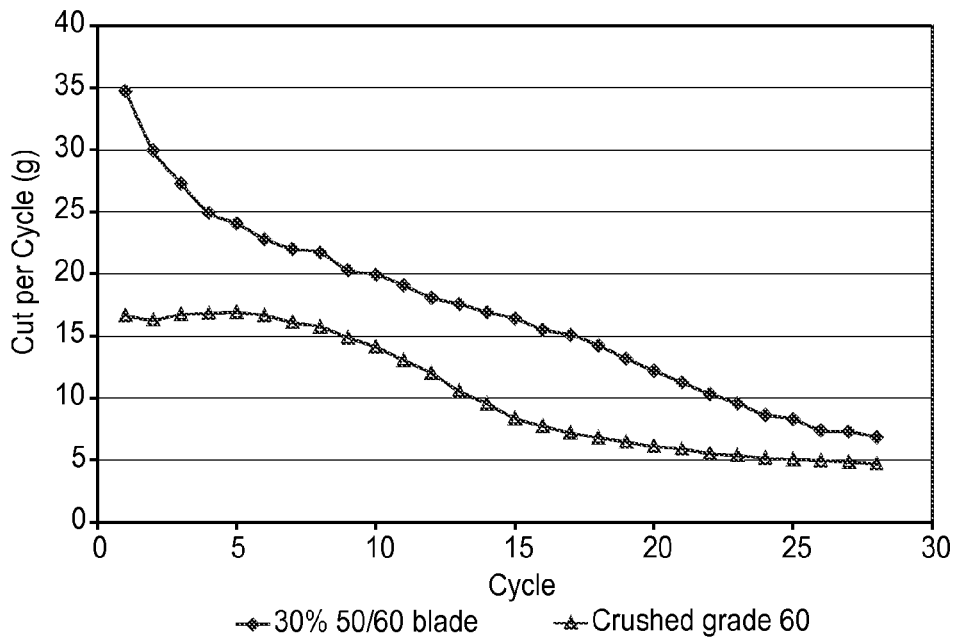
FIG. 13 is a graph of cut rate as a function of cycles for 30%−50/+60 right rhombic pyramidal shaped abrasives (FIG. 1) with crushed particles versus 100% crushed particles.

Additionally, the shaped abrasive particle can have a plurality of ridges extending from the second side 26 as seen in FIG. 8. The ridges can be placed onto the facets 46 (or the second face 48) such that a stair-step appearance is formed on the second side 26 by concentric ridges. In other embodiments, the ridges can form parallel, non-intersecting lines or parallel, intersecting lines (cross hatch pattern). In one embodiment, the concentric ridges comprise an equilateral triangular cross-section rising above the facet surfaces on the second side and having a base dimension between 8-10 micrometers, a height between 3-5 micrometers, and linearly spaced approximately every 40-45 micrometers. In other embodiments, the cross-section of the ridges can be square, rectangular, trapezoidal, triangular, or other geometric shapes. The ridges are believed to increase the surface area of the second side 26 thereby promoting improved adhesion in the resin coating of the coated abrasive article. The plurality of ridges can be formed by a plurality of grooves cut into the bottom surface of the mold cavity. While the ridges are only shown in the embodiment of FIG. 8, such a feature can be used with any of the features or combinations of features or embodiments shown or described in this patent application.

The shaped abrasive particles 20 can have various volumetric aspect ratios. The volumetric aspect ratio is defined as the ratio of the maximum cross sectional area passing through the centroid of a volume divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a uniform thickness equal to A will have a volumetric aspect ratio of 1.54, and if the uniform thickness is reduced to 0.25 A, the volumetric aspect ratio is increased to 2.64. It is believed that dual tapered shaped abrasive particles having a larger volumetric aspect ratio have enhanced cutting performance. In various embodiments of the invention, the volumetric aspect ratio for the shaped abrasive particles can be greater than about 1.15, or greater than about 1.50, or greater than about 2.0, or between about 1.15 to about 10.0, or between about 1.20 to about 5.0, or between about 1.30 to about 3.0.

Shaped abrasive particles 20 made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10, 000.

Alternatively, the shaped abrasive particles 20 can graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles 20 pass through a test sieve meeting ASTM E-11 specifications for the number 18 sieve and are retained on a test sieve meeting ASTM E-11 specifications for the number 20 sieve. In one embodiment, the shaped abrasive particles 20 have a particle size such that most of the particles pass through an 18 mesh test sieve and can be retained on a 20, 25, 30, 35, 40, 45, or 50 mesh test sieve. In various embodiments of the invention, the shaped abrasive particles 20 can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

In one aspect, the present disclosure provides a plurality of shaped abrasive particles having an abrasives industry specified nominal grade or nominal screened grade, wherein at least a portion of the plurality of abrasive particles are shaped abrasive particles 20. In another aspect, the disclosure provides a method comprising grading the shaped abrasive particles 20 made according to the present disclosure to provide a plurality of shaped abrasive particles 20 having an abrasives industry specified nominal grade or a nominal screened grade.

If desired, the shaped abrasive particles 20 having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are shaped abrasive particles 20 made according to the present disclosure, based on the total weight of the plurality of abrasive particles.

Particles suitable for mixing with the shaped abrasive particles 20 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped abrasive particles 20 (rhombus, kite, or triangle for example) or blends of shaped abrasive particles 20 with sloping sidewalls having different draft angles (for example particles having an 98 degree draft angle mixed with particles having a 120 degree draft angle) can be used in the articles of this invention.

For some applications, blends of shaped abrasive particles and conventional abrasive grains have been found to work well. In these applications, as shown in the examples, even a small amount of the shaped abrasive particles, such as 10% by weight, significantly boast performance. In blends of shaped abrasive particles with conventional abrasive grains or diluent grains, the weight of the shaped abrasive particles in the blend can be less than or equal to 50, 40, 30, 25, 20, 15, or 10% and still provide a significant performance increase.

The shaped abrasive particles 20 may also have a surface coating. Surface coatings are known to improve the adhesion between abrasive grains and the binder in abrasive articles or can be used to aid in electrostatic deposition of the shaped abrasive particles 20. In one embodiment, surface coatings as described in U.S. Pat. No. 5,352,254 in an amount of 0.1%-2% inorganics to shaped abrasive particle weight were used. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

Abrasive Article Having Dual Tapered Shaped Abrasive Particles

Referring to FIG. 6, a coated abrasive article 54 comprises a backing 56 having a first layer of binder, hereinafter referred to as the make coat 58, applied over a first major surface 60 of backing 56. Attached or partially embedded in the make coat 58 are a plurality of shaped abrasive particles 20 forming an abrasive layer. Over the shaped abrasive particles 20 is a second layer of binder, hereinafter referred to as the size coat 62. The purpose of make coat 58 is to secure shaped abrasive particles 20 to the backing 56 and the purpose of size coat 62 is to reinforce shaped abrasive particles 20. An optional super size coating, as known to those of skill in the art, may also be applied. The majority (greater than 50%) of the shaped abrasive particles 20 are oriented such that one of the opposing major vertices 34 points away from the backing 56 and one of the opposing major vertices 34 is embedded into the make coat 58.

To further optimize use of the dual tapered shaped abrasive particles, a closed coat abrasive layer can be used. A closed coat abrasive layer is defined as the maximum weight of abrasive particles or a blend of abrasive particles that can be applied to a make coat of an abrasive article in a single pass through the maker. An open coat is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles.

The make coat 58 and size coat 62 comprise a resinous adhesive. The resinous adhesive of the make coat 58 can be the same as or different from that of the size coat 62. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 58 or size coat 62, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

A grinding aid can be applied to the coated abrasive article. A grinding aid is defined as particulate material, the addition of which has a significant effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In one embodiment, the grinding aid was cryolite or potassium tetrafluoroborate. The amount of such additives can be adjusted to give desired properties. It is also within the scope of this invention to utilize a supersize coating. The supersize coating typically contains a binder and a grinding aid. The binders can be formed from such materials as phenolic resins, acrylate resins, epoxy resins, urea-formaldehyde resins, melamine resins, urethane resins, and combinations thereof. In some embodiments, a supersize coating comprising a thermosetting epoxy resin, a curative, a thermoplastic hydrocarbon resin, a grinding aid, a dispersing agent, and a pigment is used as disclosed in U.S. Pat. No. 5,441,549 (Helmin).

It is also within the scope of this invention that the shaped abrasive particles 20 can be utilized in a bonded abrasive article, a nonwoven abrasive article, or abrasive brushes. A bonded abrasive can comprises a plurality of the shaped abrasive particles 20 bonded together by means of a binder to form a shaped mass. The binder for a bonded abrasive can be metallic, organic, or vitreous. A nonwoven abrasive comprises a plurality of the shaped abrasive particles 20 bonded to a fibrous nonwoven web by means of an organic binder.

Method of Making Dual Tapered Shaped Abrasive Particles

The first process step involves providing either a seeded on non-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting shaped abrasive particles 20 will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent (seeding) to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, by simply mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material.

In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavity can extend for the entire thickness of mold. Alternatively, the cavity can extend only for a portion of the thickness of the mold. In one embodiment, the top surface is substantially parallel to bottom surface of the mold with the cavities having a substantially uniform depth. At least one side of the mold, i.e. the side in which the cavity is formed, can remain exposed to the surrounding atmosphere during the step in which the volatile component is removed.

The cavity has a specified three-dimensional shape to make the shaped abrasive particles illustrated in FIGS. 1-5. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the abrasive dispersion by any conventional technique. In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc sterate, and graphite. In general, between about 0.1% to about 5% by weight mold release agent, such as peanut oil, in a liquid, such as water or alcohol, is applied to the surfaces of the production tooling in contact with the sol-gel such that between about 0.1 $mg/in^2$ to about 3.0 $mg/in^2$, or between about 0.1 $mg/in^2$ to about 5.0 $mg/in^2$ of the mold release agent is present per unit area of the mold when a mold release is desired. In one embodiment, the top surface of the mold is coated with the abrasive dispersion. The abrasive dispersion can be pumped onto top surface. Next, a scraper or leveler bar can be used to force the abrasive dispersion fully into the cavity of the mold. The remaining portion of the abrasive dispersion that does not enter cavity can be removed from top surface of the mold and recycled. In some embodiments, a small portion of the abrasive dispersion can remain on the top surface and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface to ensure uniformity in thickness of the resulting shaped abrasive particles 20.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic.

In one embodiment, for a water dispersion of between about 40 to 50 percent solids and a polypropylene mold, the drying temperatures can be between about 90 degrees C. to about 165 degrees C., or between about 105 degrees C. to about 150 degrees C., or between about 105 degrees C. to about 120 degrees C. Higher temperatures can lead to improved production speeds but can also lead to degradation of the polypropylene tooling limiting its useful life as a mold.

The fifth process step involves removing the precursor shaped abrasive particles with from the mold cavities. The precursor shaped abrasive particles can be removed from the cavities by using the following processes alone or in combination on the mold: gravity, vibration, ultrasonic vibration, vacuum, or pressurized air to remove the particles from the mold cavities.

The precursor abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor shaped abrasive particles will be dried from 10 to 480 minutes, or from 120 to 400 minutes, at a temperature from 50 degrees C. to 160 degrees C., or at 120 degrees C. to 150 degrees C.

The sixth process step involves calcining the precursor shaped abrasive particles. During calcining, essentially all the volatile material is removed, and the various components that were present in the abrasive dispersion are transformed into metal oxides. The precursor shaped abrasive particles are generally heated to a temperature from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor shaped abrasive particles. Then the precursor shaped abrasive particles are pre-fired again. This option is further described in European Patent Application No. 293,163.

The seventh process step involves sintering the calcined, precursor shaped abrasive particles to form alpha alumina particles. Prior to sintering, the calcined, precursor shaped abrasive particles are not completely densified and thus lack the desired hardness to be used as shaped abrasive particles. Sintering takes place by heating the calcined, precursor shaped abrasive particles to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, precursor shaped abrasive particles must be exposed to the sintering temperature to achieve this level of conversion depends upon various factors but usually from five seconds to 48 hours is typical. In another embodiment, the duration for the sintering step ranges from one minute to 90 minutes. After sintering, the shaped abrasive particles can have a Vickers hardness of 10 GPa, 16 GPa, 18 GPa, 20 GPa, or greater.

Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser.

More information concerning methods to make shaped abrasive particles is disclosed in copending U.S. patent application Ser. No. 12/337,001 entitled "Method Of Making Abrasive Shards, Shaped Abrasive Particles With An Opening, Or Dish-Shaped Abrasive Particles", filed on Dec. 17, 2008.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Examples 1-3

Preparation of Shaped Abrasive Particles

Examples 1-3 are right rhombic pyramidal shaped abrasive particles as shown in FIG. 8. A boehmite sol-gel was made using the following recipe: aluminum oxide monohydrate powder (4824 parts) having the trade designation "DISPERAL" (Sasol North America, Houston, Tex.) was dispersed by high shear mixing a solution containing water (7087 parts) and 70% aqueous nitric acid (212 parts) for 13 minutes. The resulting sol-gel was aged for 1 hour before coating. The sol-gel was forced into production tooling having right rhombic pyramidal shaped mold cavities of dimensions as shown in Table 1. During construction of the production tooling, the surfaces of the mold cavities were manufactured to have a series grooves with triangular cross section. The grooves were 6 micron deep and had 110 degree tip angle dimension. The spacing between such features was 0.065 mm. A mold release agent, 2% peanut oil in water was coated on the production tooling to apply about 1 mg/sq in (1.55 g/sq meter) of peanut oil. The sol-gel was forced into the cavities with a vacuum slot die coating station so that all the openings of the production tooling were completely filled. The sol-gel coated production tooling was passed through a 27-foot (8.2 meters) forced convection air oven at 10 feet per minute (3 meters per minute) set to 135 degrees Celsius at 60% air velocity in the 13.5 foot (4.1 m) zone 1 section and 121 degrees Celsius at 40% air velocity in the 13.5 foot (4.1 m) zone 2 section. The precursor shaped abrasive particles were removed from the production tooling by passing it over an ultrasonic horn. The precursor shaped abrasive particles were calcined at approximately 650 degrees Celsius and then saturated with a mixed nitrate solution of the following concentration (reported as oxides): 1.8% each of MgO, $Y_2O_3$ $Nd_2O_3$ and $La_2O_3$. The excess nitrate solution was removed and the saturated precursor shaped abrasive particles were allowed to dry after which the particles were again calcined at 650 degrees Celsius and sintered at approximately 1400 degrees Celsius. Both the calcining and sintering was performed using rotary tube kilns. Representative shaped abrasive particles as shown in FIG. 8.

Surface Coating Treatment

Some of the shaped abrasive particles were treated to enhance electrostatic application of the shaped abrasive particles in a manor similar to the method used to make CUBITON 324AV crushed abrasive particles as disclosed in U.S. Pat. No. 5,352,254. The calcined, precursor shaped abrasive particles are impregnated with a rare earth oxide (REO) solution comprising 1.4% MgO, 1.7% $Y_2O_3$, 5.7% $La_2O_3$ and 0.07% CoO. Into 70 grams of the REO solution, 1.4 grams of Hydral Coat 5 powder available from Almatis of Pittsburg, Pa. (approximately 0.5 micron mean particle size) is dispersed by stirring it in an open beaker. About 100 grams of calcined, precursor shaped abrasive particles is then impregnated with the 71.4 grams of the Hydral Coat 5 powder dispersion in REO solutio. The impregnated, calcined, precursor shaped abrasive particles are then calcined again before sintering to final hardness.

TABLE 1

Abrasive Particle Description

| Example | Grade[1] | Cavity Maximum median Length, L, mm | Cavity Maximum median Width, W, mm | Cavity Height/Particle median Thickness, T, mm | Surface Coating Treatment |
|---------|----------|-------------------------------------|------------------------------------|------------------------------------------------|---------------------------|
| 1 | −70/+80 | 0.76 | 0.31 | 0.20 | No |
| 2 | −60/+70 | 0.86 | 0.31 | 0.20 | No |
| 3 | −50/+60 | 0.96 | 0.41 | 0.3 | No |
| 11 | −35/+40 | 3.34 | 1.69 | 0.81 | Yes |
| 12 | −35/+40 | 3.34 | 1.69 | 0.85 | Yes |
| Comp. A | −70/+80 | n/a[2] | n/a | n/a | No |
| Comp. B | −60/+70 | n/a | n/a | n/a | No |
| Comp. C | 60 | n/a | n/a | n/a | Yes |
| Comp. H | −35/+40 | 1.45 | 1.68 | 0.70 | Yes |

[1]The grade notation "−X/+Y" indicates that the particles will pass through a sieve of size X, but is retained on a sieve of size Y
[2]n/a means "not applicable"

Comparative Examples A-C

Comparative Examples A-C were commercially available sol gel derived crushed abrasive particles sieved to comparable screen cuts as those of Examples 1-3. These particles are commercially available from 3M Company under the trade name "CUBITRON 321". In Table 1-70/+80 indicates that the particles can pass thru mesh size 70 but are retained on mesh size 80.

Examples 4-6 and Comparative Examples D-F

Examples 4-6 and Comparative Examples D-F were abrasive articles prepared from the abrasive particles prepared as Examples 1-3 and Comparative Examples A-C. These particles were coated on a 7 inch (17.8 cm) diameter fiber disc with a ⅞ inch (2.2 cm) hole. The make and size coat compositions are shown in Table 2. The vulcanized fiber backing having a thickness of 0.83 mm (33 mils) (obtained under the trade designation "DYNOS VULCANIZED FIBRE" from DYNOS Gmbh, Troisdorf, Germany) was coated with 3.0 grams/disc of the make coat composition, electrostatically coated with 5.0 grams/disc of abrasive particles, and then 10.0 grams/disc of the size coat composition was applied. In the case of Example 6, the abrasive particles were a mixture of 30% Example 3 shaped abrasive particles and 70% brown aluminum oxide particles (grade P100 "FSX", obtained from Treibacher Schleifmittel North America, Inc., Niagra Falls, N.Y.) Following curing at 102 degree Centigrade for 10 hours, the discs were flexed and then tested according to Grinding Test 1. Test results are shown in FIGS. 9-19.

TABLE 2

Make and Size Coat Resins

| Material | Description | Make | Size |
| --- | --- | --- | --- |
| Resole phenolic resin | Metal hydroxide catalyzed phenol-formaldehyde resin, ca. 75% in water | 49.15% | 29.42% |
| Water | Water | 10.19% | 18.12% |
| Filler | Calcium carbonate having a particle size less than 46 micrometers and an average particle size of about 15 micrometers, obtained as "Georgia Marble No. 10" from Georgia Marble, Gantts Quarry, AL | 40.56% | none |
| Grinding aid | Cryolite, obtained as "RTN Cryolite" from TR International Trading Co., Houston, TX | none | 50.65% |
| Surfactant | 0.5% ethoxylated oleic acid surfactant, obtained as "EMULON A" from BASF Corp., Mount Olive, NJ | 0.10% | 1.81% |
| Total | | 100% | 100% |

Grinding Test 1

The abrasive discs were tested using the following procedure. 7-inch (17.8 cm) diameter abrasive discs for evaluation were attached to a rotary grinder fitted with a 7-inch (17.8 cm) disc pad face plate ("45193 Medium Gray" obtained from 3M Company, St. Paul, Minn.). The grinder was then activated and urged against an end face of a 0.75×0.75 in (1.9×1.9 cm) pre-weighed 1045 medium carbon steel bar under a load of 8 lb (3.6 kg). The resulting rotational speed of the grinder under this load and against this workpiece was 5000 rpm. The workpiece was abraded under these conditions for a total of fifty (50) 15-second grinding intervals (passes). Following each 15-second interval, the workpiece was allowed to cool to room temperature and weighed to determine the cut of the abrasive operation. Test results were reported as the cumulative cut and cut rate for Examples 4 and 5, and as incremental cut for each interval for Example 6. If desired, the testing can be automated using suitable equipment.

Results

Discs made with grade −70/+80 rhombic pyramidal shaped geometry, shaped abrasive particles outperformed those made with similar particles obtained from conventional roll crushing. The cut rate and cumulative cut for the discs made with shaped abrasive particles was significantly higher than discs made with crushed particles. These results are presented in FIG. 9 as Cut Rate as a function of Cycles and FIG. 10 as Total Cut as a function of Time for particles with mesh size −70/+80.

Discs made with particles of grade −60/+70 rhombic pyramidal shaped geometry outperformed those made with similar particles obtained from conventional roll crushing. The cut rate and cumulative cut for the discs made with shaped particles was also significantly higher than discs made with crushed particles. These results are presented in FIG. 11 as Cut Rate as a function of Cycles and FIG. 12 as Total Cut as a function of Time for particles with mesh size −60/+70.

The cut for the discs made with 30% rhombic pyramidal shaped abrasive particles of grade −50/+60 blended with the same screen size crushed abrasive particles was significantly higher than discs made with 100% crushed particles in the grade −50/+60. These results are presented in FIG. 13 as Cut per Cycle as a function of Cycles. Thus, only a small amount of the dual tapered shaped abrasive particles is needed to significantly boast performance.

Examples 7 Through 10 and Comparative Example G

Examples 7-10 and Comparative Example G demonstrates the efficacy of the inventive shaped abrasive particles when deployed as a minority in blends with commercially available crushed particles. Blends were prepared of the shaped abrasive particles of Example 2 and commercially available crushed particles of a similar size (brown aluminum oxide grade P80 "FSX", obtained from Treibacher Schleifmittel North America, Inc., Niagra Falls, N.Y.) The compositions of these abrasive blends are identified in Table 3. These particle blends were used to prepare abrasive sheets.

Example 7 was prepared from a 16×24 in (40.6×61.0 cm) standard C-weight (120 gsm) paper backing with a coat-side barrier layer was coated with a make coating comprising resole phenolic resin dispersed in 55% water containing 0.5% of a nonionic surfactant ("Interwet 33" from Interstab Chemicals of New Brunswick, N.J.) using a ribbed coating rod. An amount of 25 grams of the mineral blend was weighed and spread evenly on a mineral tray in preparation for electrostatic coating. The coated backing was electrostatically coated for 10 seconds. The particle coated sheet was the cured in a forced-convection ovens for 50 minutes at 210 degrees F. (99 C) followed by 60 minutes at 220 degrees F. (104 C). A size coating of the same composition as the make coating was then applied by brushing until a uniformly wet appearance was obtained. The size-coated article was then cured in sequential steps at 185 degrees F. (85 C) for 60 minutes, 210 F (99 C) for 60 minutes, 220 degrees F. (104 C) for 30 minutes, and at 235 degrees F. (113 C) for 30 minutes. A supersize coating of a 50% aqueous calcium stearate dispersion, commercially available under the trade designation "E-1058", from E-Chem, Leeds, England was applied by brushing and allowed to dry overnight. The now completed abrasive article was prepared for evaluation by applying an attachment layer to the nonabrasive side and cutting out a 5-inch (12.7 cm) diameter circular disc.

Discs of Examples 8 through 10 and Comparative Example G were prepared identically to the disc of Example 7 with the exception that the composition of the abrasive particle blend was varied as shown in Table 3. Discs of Examples 7-10 and Comparative Example G were evaluated according to the Wood Test.

Wood Test

Discs were attached to a 12.7-cm (5.0-inch) diameter by 0.95-cm (⅜-inch) thick foam back up pad, available under the trade designation "3M STIKIT or HOOKIT BACKUP PAD, #20206" from 3M Company, St. Paul, Minn. The backup pad and disc assembly were then mounted onto a 12.7-cm (5-inch) diameter, medium finishing, dual-action orbital sander, "model 050237", obtained from Air Vantage Tools, El Monte, Calif. A pre-weighed dust collection device (11.43 cm×15.24 cm) was attached to the dust exit port of the sander. The abrasive face of the disc was manually brought into contact with a pre-weighed, 40.6 cm by 40.6 cm (16 inches by 16 inches) hard maple wood test workpiece, obtained from Woodcrafts Industrial, St. Cloud, Minn. The sander was run at 620 kPa (90 psi) air line pressure and a down-force of 15 pounds force (44 N) for 8 cycles of 150 seconds each. An angle of zero degrees to the surface of the work piece was used. Each cycle consisted of 48 overlapping transverse passes, for a combined 1008 inches (25.16 meters) total path length, at a tool speed of 17 cm per second (6.7 inches per second) across the panel surface resulting in an evenly sanded area of test panel. "Cut": weight, in grams, that was removed from the wood panel was recorded. Reported data based on the average of 3 test samples. The comparative test results are shown in Table 3.

TABLE 3

Abrasive Blend Composition and Resulting Cut

| Example | Wt. % Example 2 Shaped Particles | Wt. % P80 FSX Particles | Cut, grams |
|---|---|---|---|
| Comp. G | 0 | 100 | 20.13 |
| 7 | 10 | 90 | 36.10 |
| 8 | 25 | 75 | 40.20 |
| 9 | 50 | 50 | 45.43 |
| 10 | 100 | 0 | 46.85 |

The addition of as little as 10 weight percent of the Example 2 (Table 1) shaped abrasive particles nearly doubles the cumulative cut performance of the abrasive article. Further increases in the relative amount of Example 2 shaped abrasive particles further increases cut performance, but less dramatically.

Examples 11 and 12 and Comparative Example H

The abrasive particles of Examples 11 and 12 and Comparative Example H were prepared identically to the particles of Example 1 with the exception that the mold cavities in the tooling were changed.

The mold cavities of Example 11 were an opening that is shaped as an elongated rhombus and also an elongated rhombus shaped base in the mold. The rhombus shaped base is slightly smaller to provide an eight degree draft angle on the walls of the cavity to make shaped abrasive particles as shown in FIG. 3.

The mold cavities of Example 12 were an opening that is shaped as an elongated rhombus. The four sides of the rhombus shape tapper down to an apex at forty five degree draft angle on the walls of the cavity to make shaped abrasive particles as shown in FIG. 1.

The mold cavities of Comparative Example H were an opening that is shaped as an equilateral triangle and also an equilateral triangular shaped base. The triangular base is slightly smaller to provide an eight degree draft angle on the walls of the cavity.

Examples 13 and 14 and Comparative Example J

The abrasive articles of Examples 13-14 and Comparative Example J were made identically to those of Example 4 with the exceptions that 1) the particles of Example 11 (elongated rhombus shown in FIG. 3), Example 12 (elongated rhombohedryl pyramid shown in FIG. 1) and Comp. Example H (equilateral triangular prism) were substituted; 2) a supersize layer comprising KBF4 in phenolic resin was applied to each disc; and 3) both 10 gram/disc abrasive weight open coat and 100% closed coat (34 gram/disc for Example 11, 22 gram/disc for Example 12 and 22 gram per disc for Comparative Example J) versions were prepared. The grinding performance of Examples 13-14 and Comp. Example J was evaluated on stainless steel according to the Grinding Test 2 (results shown in FIGS. 14-16) and on 1045 medium carbon steel according to the Grinding Test 1, but limited to 42-45 cycles instead of 50 (results shown in FIGS. 17-19). The cut performance of Examples 13 and 14 improves with increasing abrasive grain content. The closed coat discs in Examples 13 and 14 outperform the open coat discs. The Comparative Example J discs show the opposite behavior, cut performance decreases going from an open to a closed coat.

Grinding Test 2

The abrasive discs were tested using the following procedure. 7-inch (17.8 cm) diameter abrasive discs for evaluation were attached to a rotary grinder fitted with a 7-inch (17.8 cm) disc pad face plate ("45193 Medium Gray" obtained from 3M Company, St. Paul, Minn.). The grinder was then activated and urged against an end face of a 0.75×0.75 in (1.9×1.9 cm) pre-weighed 304 stainless steel bar under a load of 12 lb (5.4 kg). The resulting rotational speed of the grinder under this load and against this workpiece was 5000 rpm. The workpiece was abraded under these conditions for a total of between 6 and 12 15-second grinding intervals (passes). Following each 15-second interval, the workpiece was allowed to cool to room temperature and weighed to determine the cut of the abrasive operation. Test results were reported as the cumulative cut and cut rate for Examples 4 and 5, and as incremental cut for each interval for Example 6. If desired, the testing can be automated using suitable equipment.

Figure 14:
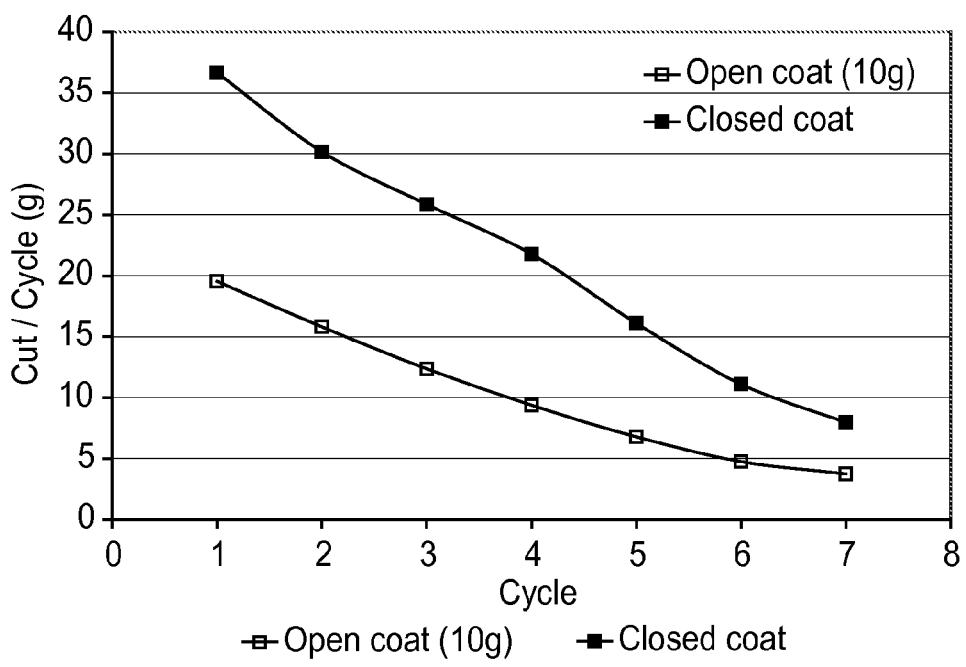
FIG. 14 is a graph of cut rate as a function of cycle for the shaped abrasive particles of FIG. 3 on stainless steel.
Figure 15:
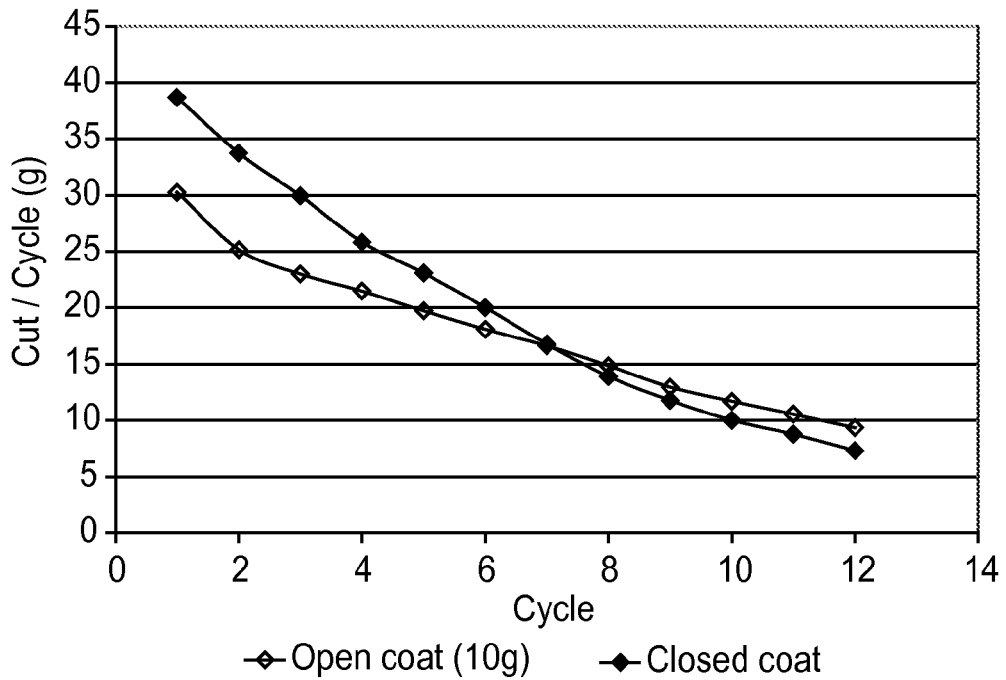
FIG. 15 is a graph of cut rate as a function of cycle for the shaped abrasive particles of FIG. 1 on stainless steel.
Figure 16:
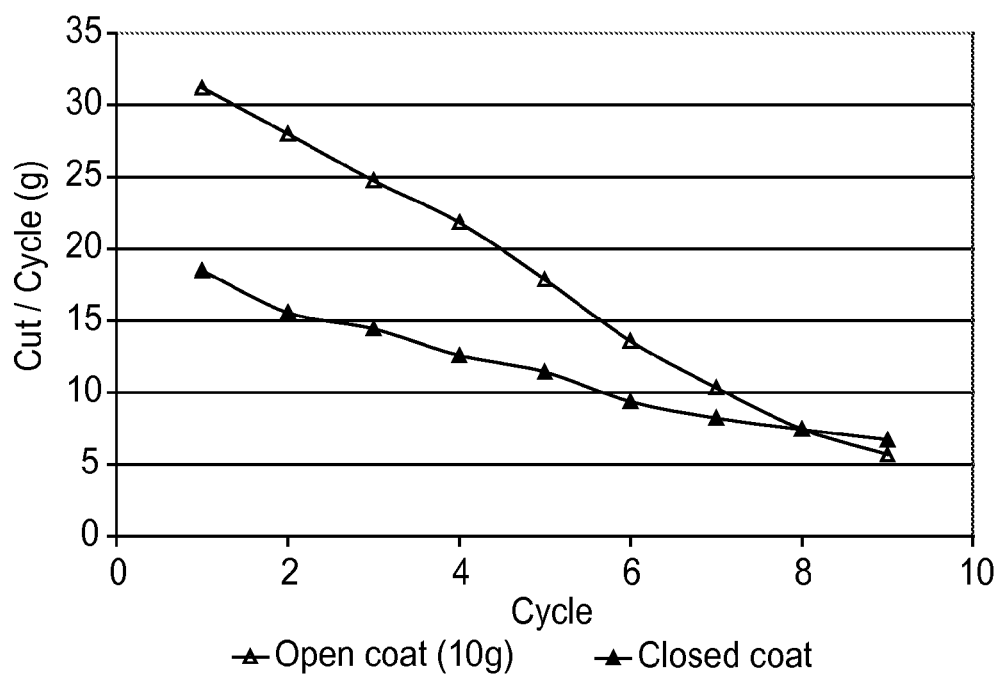
FIG. 16 is a graph of cut rate as a function of cycle for shaped abrasive particles having two parallel equilateral triangular faces on stainless steel.

FIG. 14 presents the performance of shaped abrasive particles with two elongated rhombus parallel faces (FIG. 3) and FIG. 15 present the performance of one elongated rhombus face (FIG. 1) shaped abrasive particles on stainless steel. The median sizes of these particles are mesh 40. It can be seen that in both cases there is an increase in initial cut rate from an open coat construction to a closed coat construction. On the other hand in FIG. 16 where comparative shaped abrasive particles with two equilateral triangle parallel faces of 40 mesh particle size is shown, the grinding performance drops from an open coat to a closed coat. Thus, the inventive shaped abrasive particles perform better in closed coat constructions than previous shaped abrasive particles.

Figure 17:
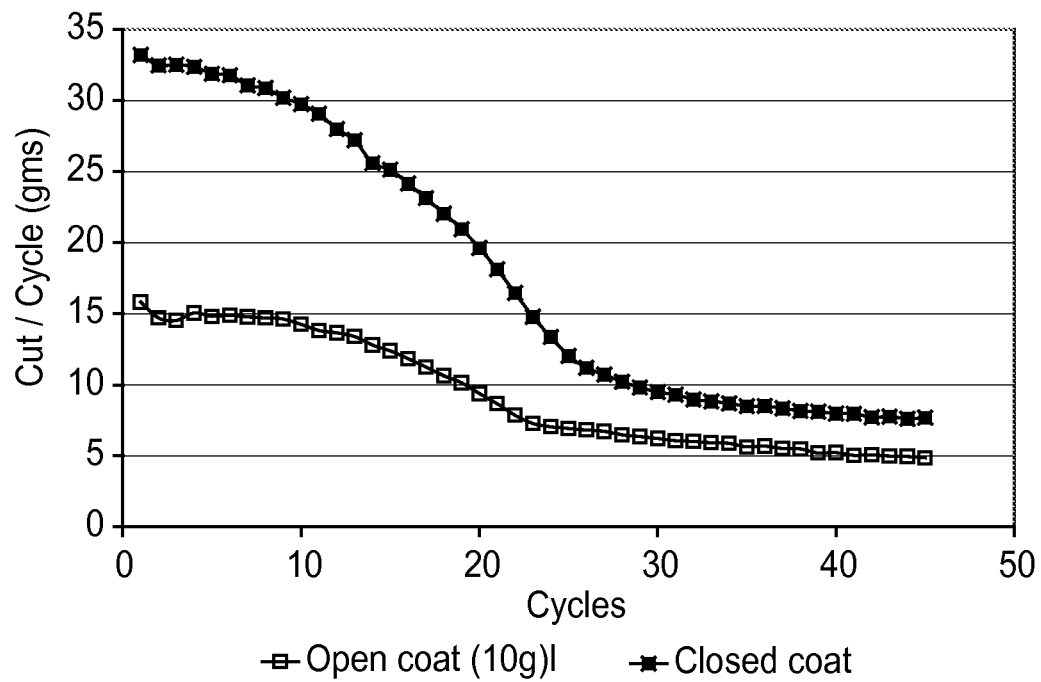
FIG. 17 is a graph of cut rate as a function of cycle for the shaped abrasive particles of FIG. 3 on mild steel.
Figure 18:
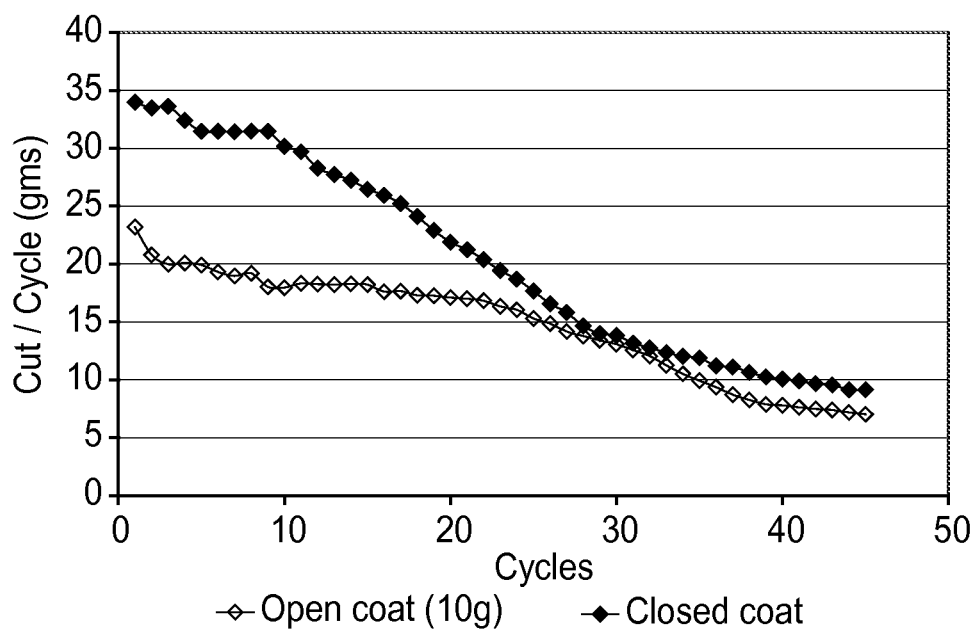
FIG. 18 is a graph of cut rate as a function of cycle for the shaped abrasive particles of FIG. 1 on mild steel.
Figure 19:
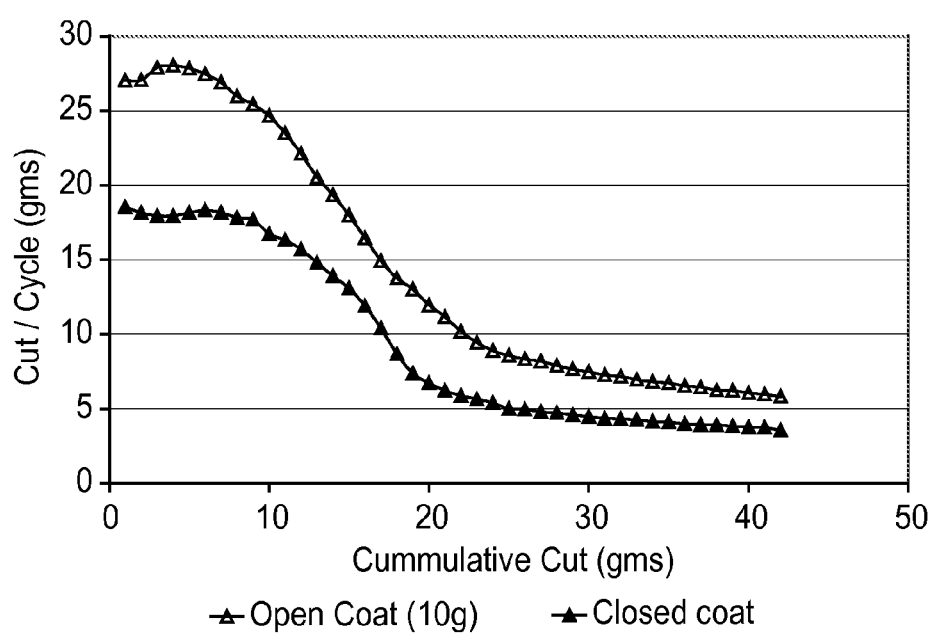
FIG. 19 is a graph of cut rate as a function of cumulative cut for shaped abrasive particles having two parallel equilateral triangular faces on stainless steel.

FIG. 17 presents the performance of shaped abrasive particles with two elongated rhombus parallel faces (FIG. 3) and FIG. 18 presents the performance of shaped abrasive particles with one elongated rhombus face (FIG. 1) on mild steel. The median sizes of these particles are mesh 40. It can be seen that in both cases there is an increase in initial cut rate from an open coat construction to a closed coat construction. On the other hand, in FIG. 19 where comparative shaped abrasive particles with two equilateral triangle parallel faces of 40 mesh particle size is shown, the grinding performance drops from an open coat to a closed coat. Thus, the inventive shaped abrasive particles perform better in closed coat constructions than previous shaped abrasive particles.

These results show that these inventive geometries can be optimized for low pressure grinding applications. Previously, in order to get a good grinding cut rate, an open coat construction with the triangular particles was necessary. In comparison under these grinding conditions, there is an increase in grinding performance with reduced openness of the mineral for the shaped particles with at least one elongated rhombus shaped face.

Paint Sanding Performance

The abrasive articles of Examples 9, 10, and Comp. Example G were compared according to the Paint Sanding Test. The results are shown in Table 4.

Paint Sanding Test

Discs were attached to a 12.7-cm (5.0-inch) diameter by 0.95-cm (⅜-inch) thick foam back up pad, available under the trade designation "3M STIKIT or HOOKIT BACKUP PAD, #20206" from 3M Company. The backup pad and disc assembly was then mounted onto a 12.7-cm (5-inch) diameter, medium finishing, dual-action orbital sander, "MODEL 050237", obtained from Air Vantage Tools, El Monte, Calif. The abrasive face of the disc was manually brought into contact with a pre-weighed, 46 cm by 76 cm (18 inches by 30 inches) Paint, Primer, and E-Coat sprayed steel panels from ACT Laboratories, Inc., Hillsdale, Mich. The sander was run at 620 kPa (90 psi) air line pressure and a down-force of 15 pounds force (44 N) at an angle of 2.5 degrees to the surface of the work piece for approximately 6 cycles of 150 seconds each was used. Each sanding cycle included 48 overlapping transverse passes, for a combined approximately 1008 inches (25.16 meters) total path length, at a tool speed of approximately 17 cm per second (6.7 inches per second) across the panel surface resulting in an evenly sanded area of the test panel. A cycle represents the above total sanding time and motion by an operator before stopping sanding to inspect the work and then repeating until reaching metal. Commonly 6 cycles were needed for the steel panels.

After the first sanding cycle, the test panel was cleaned by blowing compressed air across the top of the sanded panel to remove visible dust. The panel was weighed and the finish measured using Taylor Hobson Co. profilometer. Reported data are an average of 3 test samples. The data shows the inventive shaped abrasive particles not only had a higher cut performance, but also achieved a lower surface roughness. Both are desirable attributes.

TABLE 4

Paint Sanding Results

| Example | Cut, grams | Finish, Ra in microinches |
| --- | --- | --- |
| Comparative G | 7.91 | 98.5 |
| Example 9 | 13.03 | 80 |
| Example 10 | 13.66 | 78.7 |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. Shaped abrasive particles comprising alpha alumina, wherein the alpha alumina optionally comprises a minor amount of a modifying additive for gelation of a precursor dispersion for the alpha alumina, a nucleating agent for formation of the alpha alumina from the precursor dispersion, a peptizing agent to improve stability of the alpha alumina precursor dispersion, residual solvent from the alpha alumina precursor dispersion, a release agent, an electrostatic deposition aid, or a combination thereof, the shaped abrasive particles having a first side, a second side, a maximum length along a longitudinal axis and a maximum width transverse to the longitudinal axis; the first side comprising a quadrilateral having four edges and four vertices with the quadrilateral selected from the group consisting of a rhombus, a rhomboid, a kite, and a superellipse; and wherein an aspect ratio of the maximum length divided by the maximum width is 1.3 or greater.

2. The shaped abrasive particles of claim 1 wherein the second side comprises a vertex and four facets forming a pyramid.

3. The shaped abrasive particles of claim 2 wherein the facets intersect the first side at an angle β that is about 5 to about 65 degrees.

4. The shaped abrasive particles of claim 1 wherein the second side comprises a second face and four facets intersecting the second face at a draft angle α forming a truncated pyramid.

5. The shaped abrasive particles of claim 4 wherein the draft angle α is about 95 to about 135 degrees.

6. The shaped abrasive particles of claim 1 wherein the second side comprises a second face and four facets intersecting the second face at a draft angle α of 90 degrees.

7. The shaped abrasive particles of claim 1 wherein the second side comprises a ridge line and four facets.

8. The shaped abrasive particles of claim 7 wherein the facets intersect the first side at an angle β that is about 5 to about 65 degrees.

9. The shaped abrasive particles of claim 1 wherein the aspect ratio is about 1.7 to about 5.

10. The shaped abrasive particles of claim 1 wherein one or more of the vertices is truncated.

11. The shaped abrasive particles of claim 1 wherein the second side comprises a plurality of grooves.

12. The shaped abrasive particles of claim 1 wherein the first side is concave.

13. The shaped abrasive particles of claim 1 comprising an opening passing through the first side and the second side.

14. The shaped abrasive particles of claim 1 wherein the second side comprises a plurality of ridges.

15. An abrasive article comprising:
shaped abrasive comprising alpha alumina, wherein the alpha alumina optionally comprises a minor amount of a modifying additive for gelation of a precursor dispersion for the alpha alumina, a nucleating agent for formation of the alpha alumina from the precursor dispersion, a peptizing agent to improve stability of the alpha alumina precursor dispersion, residual solvent from the alpha alumina precursor dispersion, a release agent, an electrostatic deposition aid, or a combination thereof, the shaped abrasive particles having a first side, a second side, a maximum length along a longitudinal axis and a maximum width transverse to the longitudinal axis; the first side comprising a quadrilateral having four edges and four vertices with the quadrilateral selected from the group consisting of a rhombus, a rhomboid, a kite, and a superellipse; and wherein an aspect ratio of the maximum length divided by the maximum width is 1.3 or greater; and a binder; wherein the abrasive article is selected from the group consisting of coated abrasive article, bonded abrasive article, nonwoven abrasive article, and abrasive brush.

16. The abrasive article of claim 15 wherein the coated abrasive article comprises a backing having a first major surface, a make coat applied to the first major surface, an abrasive layer applied to the make coat, the abrasive layer comprising at least 10 percent by weight of the shaped abrasive particles, and a size coat applied over the abrasive layer.

17. The abrasive article of claim 16 wherein the abrasive layer comprises a closed coat having 100% by weight of the shaped abrasive particles.

18. The abrasive article of claim 16 wherein the abrasive layer comprises a conventional grain and the shaped abrasive particles comprises less than or equal to 50% by weight of the abrasive layer.

19. The shaped abrasive particle of claim 1, wherein the shaped abrasive particle consists of the alpha alumina.

20. The shaped abrasive particle of claim 1, wherein the shaped abrasive particle consists of the alpha alumina comprising none of the optional components.

* * * * *

UNITED STATES PATENT AND TRADEMARK OFFICE
CERTIFICATE OF CORRECTION

| | |
|---|---|
| PATENT NO. | : 9,447,311 B2 |
| APPLICATION NO. | : 13/498636 |
| DATED | : September 20, 2016 |
| INVENTOR(S) | : Negus Adefris |

It is certified that error appears in the above-identified patent and that said Letters Patent is hereby corrected as shown below:

In the Drawings

<u>Sheet 8 of 13, in (FIG. 10), in the (Y axis) Heading</u>
Line 1, delete "Cummulative" and insert -- Cumulative --, therefor.

<u>Sheet 9 of 13, in (FIG. 12), in the (Y axis) Heading</u>
Line 1, delete "Cummulative" and insert -- Cumulative --, therefor.

<u>Sheet 13 of 13, in (FIG. 19), in the (X axis) Heading</u>
Line 1, delete "Cummulative" and insert -- Cumulative --, therefor.

In the Specification

<u>Column 4</u>
Line 63, delete "a#1)" and insert -- $a \neq b$ --, therefor.

<u>Column 9</u>
Line 35, delete "erodable" and insert -- erodible --, therefor.

<u>Column 13</u>
Line 53, delete "sterate," and insert -- stearate, --, therefor.

<u>Column 16</u>
Line 17, delete "manor" and insert -- manner --, therefor.
Line 18, delete "CUBITON" and insert -- CUBITRON --, therefor.
Line 24, delete "Pittsburg," and insert -- Pittsburgh, --, therefor.
Line 28, delete "solutio." and insert -- solution. --, therefor.

Signed and Sealed this
Seventh Day of March, 2017

Michelle K. Lee
*Director of the United States Patent and Trademark Office*

CERTIFICATE OF CORRECTION (continued)
U.S. Pat. No. 9,447,311 B2

Column 17
Line 13, delete "Niagra" and insert -- Niagara --, therefor.

Column 18
Line 29, delete "Niagra" and insert -- Niagara --, therefor.

Column 20
Line 2, delete "rhombohedryl" and insert -- rhombohedral --, therefor.